United States Patent [19]

Meyer

[11] Patent Number: 4,654,657

[45] Date of Patent: Mar. 31, 1987

[54] CIRCUIT ARRANGEMENT CONTAINING WIRE MATRIX FOR SIGNAL TRANSMISSION IN ELEVATOR INSTALLATIONS

[75] Inventor: Fritz Meyer, Küssnacht a.R., Switzerland

[73] Assignee: Inventio AG, Hergiswil, Switzerland

[21] Appl. No.: 516,585

[22] Filed: Jul. 25, 1983

[30] Foreign Application Priority Data

Aug. 18, 1982 [CH] Switzerland ........................ 4932/82

[51] Int. Cl.⁴ .......................... H04Q 1/00; B66B 3/00

[52] U.S. Cl. ............................ 340/825.8; 340/825.82; 187/100

[58] Field of Search ............ 340/19 R, 20, 21, 825.13, 340/518, 340, 825.82, 825.94, 825.96, 309.4, 815.27, 825.8; 187/29 R

[56] References Cited

U.S. PATENT DOCUMENTS

| | | | |
|---|---|---|---|
| 3,882,447 | 5/1975 | Booker, Jr. . | |
| 3,898,611 | 8/1975 | Mandel . | |
| 3,974,478 | 8/1976 | Griffith et al. | 340/825.94 |
| 4,060,795 | 11/1977 | Harumiya et al. | 340/518 |
| 4,106,593 | 8/1978 | Otto et al. | 340/19 R |
| 4,111,284 | 9/1978 | Winkler et al. | 187/29 R |
| 4,121,197 | 10/1978 | Ogawa et al. | 340/825.94 |
| 4,190,836 | 2/1980 | Kimura et al. | 340/825.82 |
| 4,231,016 | 10/1980 | Veda | 340/825.94 |

FOREIGN PATENT DOCUMENTS 2422248 11/1974 Fed. Rep. of Germany .

*Primary Examiner*—Ulysses Weldon
*Assistant Examiner*—Ralph E. Smith
*Attorney, Agent, or Firm*—Werner W. Kleeman

[57] ABSTRACT

The bidirectional transmission apparatus contains as an essential element a wire matrix utilized in a two-fold or dual manner. The wire matrix comprises two groups of column conductors, each group being provided for one of the two signal transmission directions, and one group of line conductors common to all column conductors. A control unit forms a component of a microprocessor and cyclically controls the line conductors and the column conductors are synchronously scanned and activated, whereby signal transmitters and signal receivers connected to the intersection or crossing points of the wire matrix are detected and controlled in a pulsed manner. The frequency and scanning ratio of the cyclical scanning operation are selected such that even the shortest contact periods to be expected are reliably detected and that, when opto-electronic indicator or display elements are activated, a continuous light or radiation of sufficient intensity is visually discernible. Due to the functional two-fold utilization of the line conductors as well as due to the cyclical operation a high transmission capacity is ensured even if the electronic and installational expense is highly reduced. Using, for example, an 8 by 16-wire matrix there thus can be detected and activated a maximum of sixty-four call and limit or terminal switch signals as well as sixty-four signallings which are simultaneously present at the wire matrix.

15 Claims, 2 Drawing Figures

CIRCUIT ARRANGEMENT CONTAINING WIRE MATRIX FOR SIGNAL TRANSMISSION IN ELEVATOR INSTALLATIONS

BACKGROUND OF THE INVENTION

The present invention relates to a new and improved circuit arrangement containing a wire matrix for signal transmission in elevator installations or the like.

In its more specific aspects, the invention relates to a new and improved circuit arrangement containing a wire matrix for signal transmission in elevator installations in which a matrix-shaped arrangement of conductors or lines can be controlled by means of line and column driving circuits or drivers via opto-couplers connected to a control unit, whereby peripheral signal transmitters and peripheral signal receivers can be connected to a central signal processing system or station. In elevator installations such arrangements serve as a transmitter apparatus for the acquisition of data by means of the elevator control serving, for example, for cabin and storey calls as well as call acknowledgement or receipting and signalling in the elevator cabin and at the storeys of the building.

The invention is based on the recognition that by using a matrix-shaped conductor or line arrangement the electronic and installational expense for connecting signal sources and signal receiving locations can be strongly reduced. Thus, for example, by using an 8 by 8-matrix including just sixteen driving channels for each of the eight column and line conductors, sixty-four intersection or crossing points can be selectively controlled. But also in the optical representation of information or data, matrix-shaped, partially mutually orthogonally aligned conductor or line arrangements can achieve cost savings with respect to electronics and connecting lines. It was therefore obvious, particularly in elevator installations in which the expense for the electronics, the installation and the required space are substantially determined by the logic inputs as well as by the signalling system, to utilize the matrix concept.

Matrix-shaped conductor arrangements as known, for example, from German Patent Publication No. 2,422,246 and its cognate U.S. Pat. No. 3,898,611, granted Aug. 5, 1975 and German Pat. No. 2,422,248 and its cognate U.S. Pat. No. 3,882,447, granted May 6, 1975, serve in elevator installations to activate the position indicators in elevator cabins as well as the signalling lamps positioned at the storeys. In both of the aforementioned known matrix-shaped conductor arrangements the indicator or display lamps for the individual storeys are arranged at the intersection or crossing points of a matrix, the lines and columns of which are each connected to a driving circuit or driver to which there is selectively applied the corresponding position or indicator signal. Preferably, a distinct group of storeys of a building is associated with each line conductor and a distinct storey in a group is associated with each column conductor. With such a circuit arrangement what is disadvantageous is that such circuit arrangement is merely suited for unidirectional signal transmission from the elevator control to the cabin or to the storeys, as the case may be. For signal transmission in reverse direction as would be required, for example, for detecting cabin and storey calls, an additional and separate wire matrix would be required together with the associated driving electronics and the corresponding connecting lines. By merely doubling the transmission paths using two matrixes, however, the cost reduction with respect to electronics and installation which is based on the matrix concept no longer can be optimally used. The invention intends to redress this condition and shortcomings.

SUMMARY OF THE INVENTION

Therefore, with the foregoing in mind it is a primary object of the present invention to provide a new and improved circuit arrangement containing a wire matrix for signal transmission in elevator installations or the like which is not afflicted with the aforementioned drawbacks and limitations heretofore discussed.

Another and more specific object of the present invention is directed to the provision of a new and improved circuit arrangement containing a wire matrix for signal transmission in elevator installations which enables connecting peripheral signal transmitters and peripheral signal receivers to a central signal processing system.

Still a further significant object of the present invention aims at providing a new and improved circuit arrangement containing a wire matrix for signal transmission in elevator installations in which peripheral signal transmitters and peripheral signal receivers are connected to a central signal processing system and in which the expense required therefor in terms of electronical and installational measures, is markedly and decisively reduced as compared with heretofore known circuit arrangements.

Another noteworthy object of the present invention is directed to a new and improved circuit arrangement containing a wire matrix for signal transmission in elevator installations or the like which is fully compatible with standardized circuits as used in modern information or data systems.

Now in order to implement these and still further objects of the invention, which will become more readily apparent as the description proceeds, the circuit arrangement of the present development is manifested by the features that, there is provided a bidirectional signal transmission by means of a wire matrix comprising a first group of column conductors for transmitting a signal from the periphery to a central signal processing system or station, a second group of column conductors for transmitting signals in the reverse direction as well as line conductors common to all column conductors. Peripheral signal transmitters are connected to first crossing points or intersections of the line conductors with the first group of column conductors and, peripheral signal receivers are connected to second crossing points or intersections of the line conductors with the second group of column conductors. The signal transmitters and signal receivers can be connected by cyclically scanning the line conductors by means of a control unit which forms a component or part of a microprocessor, linewise and in a time-division multiplex operation via the column conductors to an information or data concentrator which also forms a component or part of the microprocessor.

A first advantage achieved by the invention is based upon the functionally two-fold or dual utilization of the wire matrix. Since line conductors are used which are common to both functions of detecting the peripheral signal transmitter and activating the peripheral signal receiver, one group of line conductors can be saved in comparison to conventional arrangements having the same function. Thus, also the activating electronic installations required therefore and the connecting lines thereof leading to the command unit and to the signal processing system can be saved. The expense, which is already reduced due to the use of only one matrix arrangement, is thus additionally reduced by the functional two-fold utilization of the line conductors. Further advantages result from the circumstance that due to the cyclic activation of the line conductors and the time-division multiplex utilization of the column conductors, a clocked system is present which detects and controls the signal transmitters and signal receivers connected thereto in pulsed operation. Therefore, the elements like, for example, switches for the input of calls or opto-electronic indicator or display elements for signalling purposes which are connected to the crossing points or intersections of the line and column conductors can be simultaneously detected or activated as the case may be, either individually or in any desired number. The circuit arrangement according to the invention including an appropriately constructed and operated wire matrix for this reason has a substantially increased data or information transfer capacity. It has further been proven to be advantageous that due to the fixed-cycle or clocked operation of the line and column conductors, the functions associated with their crossing points or intersections can be activated at the same frequency, namely simultaneously within the line conductors and in a constant phase relationship between different line conductors.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
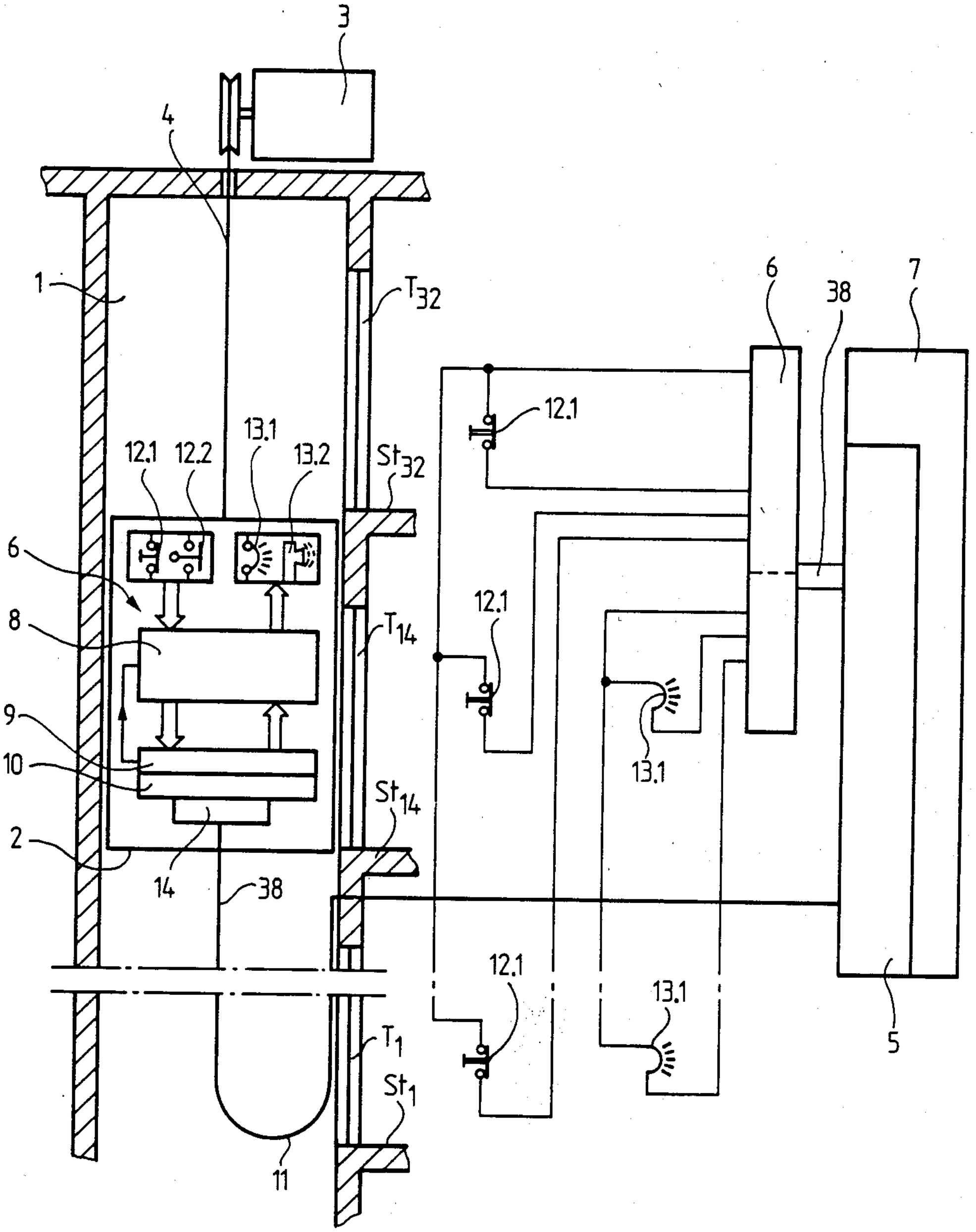
FIG. 1 is a block diagram schematically illustrating an elevator installation or system equipped with the inventive circuit arrangement for bidirectional signal transmission.

Describing now the drawings, it is to be understood that only enough of the construction of the circuit arrangement has been shown as needed for those skilled in the art to readily understand the underlying principles and concepts of the present development, while simplifying the showing of the drawings. Turning attention now specifically to FIG. 1, there has been schematically illustrated therein an elevator installation, of which a lift or elevator shaft is only partially illustrated and has been generally designated by reference character 1. An elevator or lift cabin 2 is movably guided in the elevator shaft 1. A standard conveying or drive machine 3 which is controlled by a suitable drive control (not shown) drives the elevator cabin 2 via a conveying cable or rope 4. According to the exemplary embodiment selected, the elevator system services thirty-two storeys $St_1$ to $St_{32}$. Elevator shaft doors arranged at the different storeys of the building have been designated by reference characters $T_1$ to $T_{32}$. A circuit arrangement 6 constructed according to the invention and serving for the bidirectional signal transmission between peripheral signalling devices 12, 13 in the elevator cabin 2 or at the storeys $St_1$ to $St_{32}$ and a central signal processing system 5 in the elevator control 7 is placed in the elevator cabin 2 and at a central storey like, for example, the building storey $St_{16}$. Both connection systems are analogously constructed. Therefore in the following description only the connection system from the elevator cabin 2 to the elevator control 7 will be explained in detail, wherein the signalling devices 12, 13 present in the elevator cabin 2 can be connected to the central signal processing system or station 5 via a twin-wire line or cable 38 which is present in the suspension cable 11.

As a core or principal element for the bidirectional signal transmission system or apparatus there is located in the elevator cabin 2 a wire matrix 8 which is controlled via an interface 9 by a microprocessor 10 which also belongs to the signal transmission apparatus. The wire matrix 8 will be explained in greater detail with reference to FIG. 2 in the description to follow hereinafter. Peripheral signal transmitters 12 and peripheral signal receivers 13 are each connected via a twin-wire conductor or line 31, in the direction of the periphery of the arrangement, to the wire matrix 8 for the inputting and reception, respectively, on the side of the elevator cabin 2 of signals transmitted between the elevator cabin 2 and the central signal processing system 5. As signal transmitters 12 there are provided, for instance, push-button switches 12.1 for cabin calls as well as limit or terminal switches 12.2 for the door drive and the elevator cabin floor load. The peripheral signal transmitters 12 equally may be constituted by relay contacts, sensors and so forth. The signal receivers 13 are designed as opto-electronic indicator or display elements 13.1 for signalling purposes or as electro-acoustic signalling devices, such as gongs or chimes 13.2. The wire matrix 8 is connected in the direction of the central signal processing system 5 via the interface 9 to the microprocessor 10 and via a serial interface 14 and the twin-wire conductor or line 38 in the suspension cable 11 to the central signal processing system 5.

Figure 2:
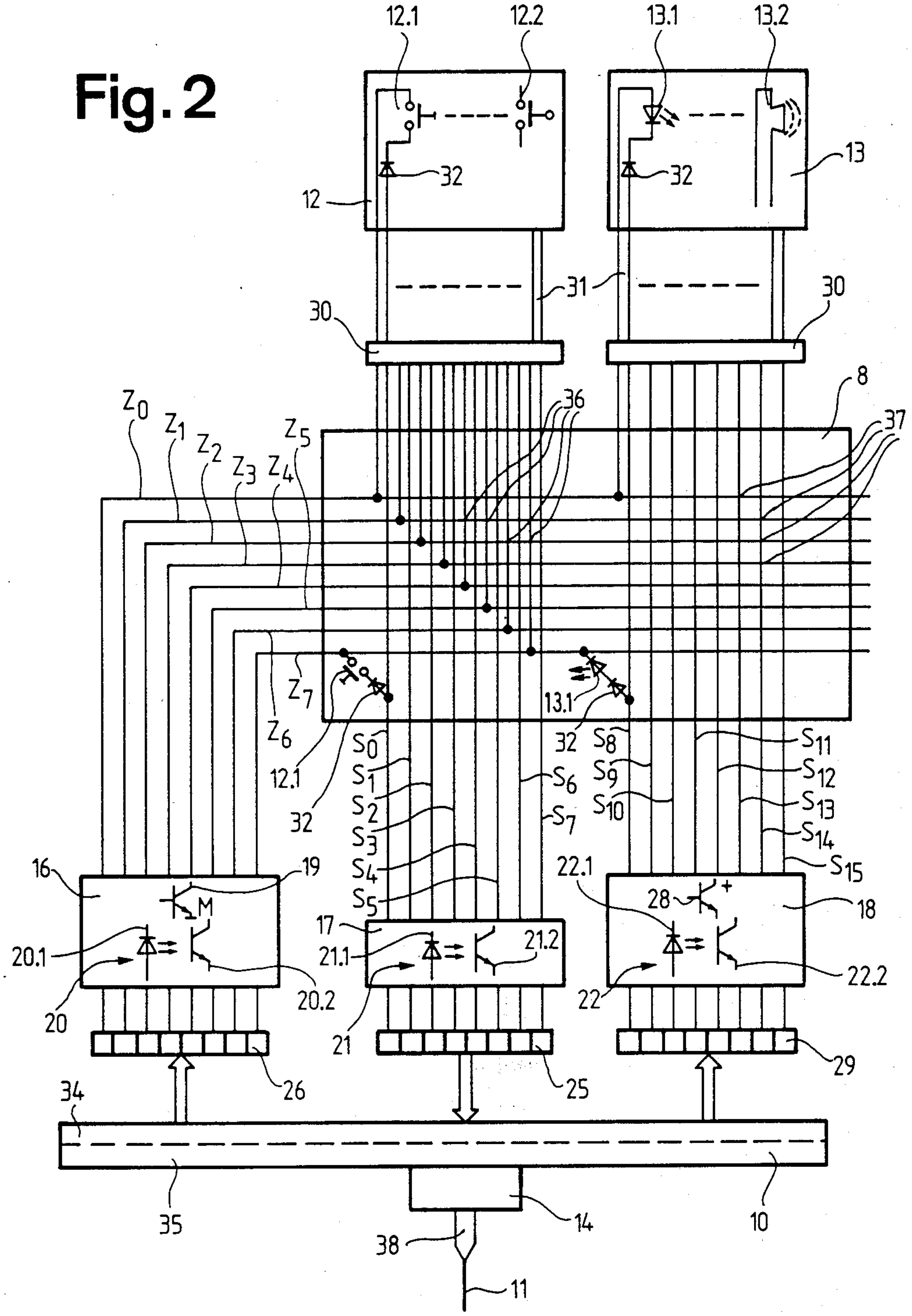
FIG. 2 is a detailed circuit diagram of the circuit arrangement according to the invention as shown in FIG. 1.

In FIG. 2, which is partially illustrated as a circuit diagram or scheme, the circuit arrangement 6 of FIG. 1 is shown in a more detailed representation. The wire matrix 8 contains a first group of eight column conductors or lines $S_0$ to $S_7$ for the transmission of signals from the peripheral signal transmitters 12 to the microprocessor 10, a second group of eight column conductors or lines $S_8$ to $S_{15}$ for transmitting signals in the reverse direction from the microprocessor 10 to the signal receivers 13 and eight line conductors or lines $Z_0$ to $Z_7$ for providing the connection scheme via the first and second group of column conductors $S_0$ to $S_7$ and $S_8$ to $S_{15}$. The line conductors $Z_0$ to $Z_7$ are associated with both groups of column conductors $S_0$ to $S_7$ and $S_8$ to $S_{15}$, and thus, are also common to both signal transmission directions. They are thus utilized in a two-fold functional manner. For better clarity of presentation the wire matrix 8 is illustrated in the form of orthogonally crossing or intersecting line conductors Z and column conductors $S_0$ to $S_{15}$. However, in the present case no such requirements exist with respect to the geometry of the wire matrix 8, which, in practice, may be designed either as tracks on a print or as wiring on a terminal strip. A respective line conductor driving circuit or drive 16 is operatively associated with each one of the line conductors $Z_0$ to $Z_7$, while each of the groups of column conductors $S_0$ to $S_7$ and $S_8$ to $S_{15}$ comprises a respective column conductor driving circuit or driver 17 and 18, respectively. The sign "+" appearing at the top of the collector of the uppermost transistor 28 depicted in the column driver 18 and the symbol "⊥" appearing at the end of the emitter of the uppermost transistor 19 depicted in the line driver 16 represent potentials and terminals of not further illustrated voltage sources.

The line conductor driving circuit 16 contains, for each line conductor Z, a transistor 19 which is connected to act as an active-0-driver with respect to the null or zero-signals. The collector and the emitter of the transistor 19 are connected in known manner to the respectively associated line conductor Z and ground. The base of the transistor 19 is connected to an opto-coupler 20 which provides the connection to the microprocessor 10 and which comprises, for instance, an infrared emitting or luminescent diode 20.1 and a phototransistor 20.2. In the first column conductor driving circuit 17 each column conductor in the first group of column conductors $S_0$ to $S_7$ is electrically connected, with respect to signals, via a respective opto-coupler 21 composed of an infrared emitting or luminescent diode 21.1 connected to a positive terminal pole and a phototransistor 21.2 to a first group of storage cells 25 which are combined to form a first buffer. It is here remarked that the current-carrying capacity of the transistors 19 connected as active-0-drivers and controlling the line conductors $Z_0$ to $Z_7$ advantageously corresponds to the collective maximum current load of all column conductors $S_0$ to $S_{15}$. The second column conductor driving circuit 18 contains, for each one of the column conductors in the second group of column conductors $S_8$ to $S_{15}$, a transistor 28 which is connected to act as an active-1-driver for one-signals and the collector and emitter of which are connected to a positive terminal or pole and to a related column conductor. The opto-couplers 22 in the second column conductor driving circuit 18 are designed in the same way as the opto-couplers 20 in the line conductor driving circuit 16. The opto-couplers 22 lead the outputs of second storage cells 29 to the inputs of the related transistors 28.

Each of the peripheral signal transmitters 12 is connected via a twin-wire conductor 31 and a blocking diode 32 to a related first crossing point or intersection 36 formed by the corresponding line conductors $Z_0$ to $Z_7$ and the first group of column conductors $S_0$ to $S_7$, while the peripheral signal receivers 13 are connected in analogous manner with second crossing points or intersections 37 formed by the corresponding line conductors $Z_0$ to $Z_7$ and the second group of column conductors $S_8$ to $S_{15}$. In both cases blocking diodes 32 are required to prevent feedback and malfunctions of other devices caused thereby. The blocking diodes 32 are poled in such a manner that current may flow from the column conductors via the signal transmitters 12 or, respectively via the signal receivers 13 to the line conductors $Z_0$ to $Z_7$.

In the elevator cabin 2 there are connected push-button switches 12.1 for passenger call input as well as limit or terminal switches 12.2 for the door drive and the cabin load so as to form peripheral signal transmitters 12. At the first crossing points or intersections 36 of the 8 by 8-matrix as provided, a maximum of sixty-four peripheral transmitters 12 can be connected. The peripheral signal receivers 13 in the elevator cabin 2 comprise predominantly opto-electronic indicator or display elements 13.1 for position indication and call acknowledgement or receipting of passenger storey calls. Also in this respect a maximum of sixty-four peripheral signal receivers 13 can be activated at the second crossing points or intersections 37 in the provided 8 by 8-matrix. In the direction of the elevator control 7 the line conductors $Z_0$ to $Z_7$ and the column conductors $S_0$ to $S_{15}$ are connected via the interface 9 to a control unit 34 for controlling the wire matrix 8 and to an information or data concentrator 35 provided for the signals. The control unit 34 as well as the information or data concentrator 35 are designed to form components or sections of the microprocessor 10 which is arranged in the elevator cabin 2 and which is connected in known manner to the elevator control 7 for bidirectional signal transmission via the serial interface 14 and the suspension cable 11.

For the purpose of a simplified illustration of the function of the circuit arrangement 6 according to the invention, it will be assumed that a passenger cabin call as well as a limit or terminal switch signal are present in the elevator cabin 2 and that simultaneously a position indicator is to be actuated. According to FIG. 2 the crossing points or intersections $Z_2$ $S_2$; $Z_4$, $S_4$; and $Z_4$, $S_{15}$ are occupied in the wire matrix 8 for this purpose.

During normal mode of operation the line conductors $Z_0$ to $Z_7$ are continuously and cyclically activated. Therefore, the control unit 34 sequentially and in a pulsed operation grounds or earths the collectors of the transistors 19 which are connected to act as active-0-drivers for the logic or null zero-signal at a scanning ratio $T_1$ and at a scanning frequency $f_1$. In case of a passenger cabin call as well as a limit switch signal which are simultaneously present a current will flow during scanning of the line conductors $Z_2$ and $Z_4$ from the column conductors $S_2$ and $S_4$ via the blocking diodes 32, the push-button switch 12.1 and the limit switch 12.2, respectively, to the line conductors $Z_2$ and $Z_4$, respectively, and from there to ground. The two currents are read into the corresponding first storage cells 25 via the related opto-couplers 21. As a consequence, the currents are transmitted as signals from the microprocessor 10 via the serial interface 14 and the twin-wire conductor 38 in the suspension cable 11 to the central signal processing system 5 in the elevator control 7. The scanning or sampling frequency $f_1$ for this operation is selected such that the shortest period of contact to be expected at the call transmitters and which amounts to about 20 milliseconds is still reliably detected. Contact periods of longer duration are therefore multiply scanned, and thus, also detected with increased reliability. It will be self-evident that not only two, but all sixty-four of the signal transmitters in the 8 by 8-matrix will be detected even when the signal transmission therefrom occurs at the same time. For the activation of the opto-electronic indicator or display element 13.1 which is connected to the crossing point or intersection $Z_4$, $S_{15}$ the column conductor $S_{15}$ is connected to the positive terminal or pole via the transistor 28 which is connected to act as an active-1-driver for the one-signal for the scanning period of the line conductor $Z_4$. Consequently, current will flow from the column conductor $S_{15}$ via the blocking diode 32 and the opto-electronic indicator element 13.1, which may, for example,, be designed as a light-emitting diode, to the line conductor $Z_4$ and further to ground. The signal for activating the transistor 28 originates from the central signal processing system 5 from where it has been read into the associated second storage cell 29 via the suspension cable 11, the serial interface 14 and the microprocessor 10 to modulate or control the transistor 28 which is connected to act as an active-1-driver for one-signals via the opto-coupler 22.

Since the peripheral signalling devices 12, 13 are line-wise activated in a fixed-cycle or clock operation from the wire matrix 8, a pulse-shaped excitation current will result at the crossing point or intersection $Z_4$, $S_{15}$ for the opto-electronic indicator element 13.1. The scanning frequency $f_1$ as well as the scanning ratio $T_1$ in the cyclic scanning operation are therefore selected such that a continuously emitted radiation of sufficient intensity will be visually discernible. Instead of the one crossing point or intersection $Z_4$, $S_{15}$, it also will be possible to operate all of the crossing points or intersections 37 in the 8 by 8-matrix in this manner. The sixty-four opto-electronic indicator elements 13.1 will then simultaneously emit continuous radiation or light. However, simultaneous activity of all signalling devices 12 and 13 connected in the circuit is not only possible within the range of the first crossing points 36 and the second crossing points 37. Since, in fact, the line conductors $Z_0$ to $Z_7$ are common to both groups of column conductors $S_0$ to $S_7$ and $S_8$ to $S_{15}$, all the signal transmitters 12 and signal receivers 13 which are associated with one of the line conductors are simultaneously scanned and activated or controlled. In case that the full transmission capacity of the 8 by 16-wire matrix 8 is utilized, there will be simultaneously connected, for example, sixty-four call transmitters and limit switches 12.2 at the first crossing points or intersections 36 as well as sixty-four opto-electronic indicator elements 13.1 at the second crossing points or intersections 37 to the central signal processing system 5 in the elevator control 7.

In a variation of the design of the circuit arrangement as described hereinbefore the wire matrix 8 also may be selectively equipped with a different number of line conductors and column conductors. Consequently, it will be possible to optimumly adapt the inventive circuit arrangement to the requirements of a specific elevator installation or system and to provide as many transmission channels in the two transmission directions as actually required.

While there are shown and described present preferred embodiments of the invention, it is to be distinctly understood that the invention is not limited thereto, but may be otherwise variously embodied and practiced within the scope of the following claims.

Accordingly, what I claim is:

1. A circuit arrangement connected between a predetermined number of peripheral signal transmitters as well as a predetermined number of peripheral signal receivers and a central signal processing system in an elevator installation, said circuit arrangement comprising:

a wire matrix;

said wire matrix comprising a first group of column conductors for transmitting signals from said predetermined number of peripheral signal transmitters, when activated, to said central signal processing system;

said wire matrix further comprising a second group of column conductors for transmitting signals from said central signal processing system to said predetermined number of peripheral signal receivers in order to activate the same;

said wire matrix also comprising a predetermined number of line conductors common to said first and said second group of column conductors and forming first crossing points associated with said first group of column conductors and connected with said predetermined number of signal transmitters and second crossing points associated with said second group of column conductors and connected with said predetermined number of signal receivers;

a microprocessor operatively connected with said wire matrix and with said central signal processing system;

said microprocessor including a control unit and an information concentrator as components thereof;

said wire matrix constituting a bidirectional signal transmission matrix transmitting, during operation of said control unit on said common line conductors, signals from a preselected number of said peripheral signal transmitters to said central signal processing system and to a preselected number of said peripheral signal receivers from said central signal processing system; and said control unit scanning said line conductors in a cyclical sequence in order to linewise connect said peripheral signal transmitters and said peripheral signal receivers via said first and said second groups of column conductors to said information concentrator in a time-division multiplex operation.

2. The circuit arrangement as defined in claim 1, further including:

a line conductor driving circuit containing a number of transistors and associated opto-couplers;

each said transistor being connected to act as an active-0-driver with respect to a logic null-signal;

a number of storage cells each associated with a respective line conductor and connected to said line conductor driving circuit; and said line conductors being cyclically scanned by sequentially grounding the same in said line conductor driving circuit in a pulsed manner at a predetermined scanning frequency via said control unit and said storage cells through respective ones of said transistors and associated opto-couplers.

3. The circuit arrangement as defined in claim 2, further including:

a first column conductor driving circuit containing a number of opto-couplers;

each said opto-coupler comprising a luminescent diode connected to a positive terminal of a voltage source and a phototransistor;

a number of first storage cells each associated with a respective column conductor in said first group of column conductors and connected to said first column conductor driving circuit;

said first storage cells being combined to form a first buffer; and each said column conductor in said first group of column conductors being connected in said first column conductor driving circuit to said first buffer combined from said first storage cells via a respective one of said opto-couplers.

4. The circuit arrangement as defined in claim 2, further including:

a second column conductor driving circuit containing a number of transistors and associated opto-couplers;

each said transistor of said second column conductor driving circuit being connected to act as an active-1-driver with respect to a logic signal;

each said opto-coupler comprising a luminescent diode and a phototransistor;

a number of second storage cells each associated with a respective column conductor in said second group of column conductors and connected to said second column conductor driving circuit;

said second storage cells being combined to form a second buffer; and each said column conductor in said second group of column conductors being connected in said second column conductor driving circuit to said second buffer combined from said second storage cells via respective ones of said transistors and associated opto-couplers.

5. The circuit arrangement as defined in claim 2, wherein:

each said transistor connected as an active-0-driver with respect to said logic null-signal and driving a respective one of said line conductors possesses a predetermined current-carrying capacity;

said first and said second groups of said line conductors possessing a predetermined maximum collective current load; and said current-carrying capacity of said transistors corresponding to said maximum collective current load of said column conductor groups.

6. The circuit arrangement as defined in claim 1, wherein:

said peripheral signal transmitters comprise switches; and each said switch interconnects a respective one of said line conductors and said column conductors at a respective one of said crossing points in said wire matrix.

7. The circuit arrangement as defined in claim 6, wherein:

each said switch comprises a push-button switch.

8. The circuit arrangement as defined in claim 6, wherein:

each said switch comprises a limit switch.

9. The circuit arrangement as defined in claim 1, wherein:

said predetermined number of peripheral signal receivers form a group of peripheral signal receivers comprising opto-electronic elements; and each said opto-electronic element interconnects a respective one of said line conductors and a respective one of said column conductors in said second group of column conductors at a respective one of said second crossing points in said wire matrix.

10. The circuit arrangement as defined in claim 9, wherein:

each said opto-electronic element comprises a luminescent diode.

11. The circuit arrangement as defined in claim 1, wherein:

said predetermined number of peripheral signal receivers form a group of peripheral signal receivers comprising electro-acoustic devices; and each said electro-acoustic device interconnects a respective one of said line conductors and a respective one of said column conductors in said second group of column conductors at a respective one of said second crossing points in said wire matrix.

12. The circuit arrangement as defined in claim 11, wherein:

each said electro-acoustic device comprises a gong.

13. The circuit arrangement as defined in claim 2, wherein:

said elevator installation contains a predetermined number of elevator cabins serving a predetermined number of storeys;

each said peripheral signal transmitter being arranged in a related one of said predetermined number of elevator cabins and containing a passenger cabin call transmitter;

each said peripheral signal receiver being arranged in a related one of said predetermined number of elevator cabins and containing a passenger storey call receiver; and said predetermined scanning frequency at which said line conductors are cyclically scanned being selected such that passenger cabin calls to be transmitted by said passenger cabin call transmitter and passenger storey calls to be received by said passenger call receiver and both of which passenger cabin calls and passenger storey calls have the shortest period of contact to be expected, are reliably detected in said passenger cabin call transmitter and said passenger storey call receiver.

14. The circuit arrangement as defined in claim 2, wherein:

a predetermined scanning frequency and a predetermined scanning ratio are employed from the cyclic activation of said line conductors;

said peripheral signal receivers comprise opto-electronic indicator elements; and said scanning frequency and said scanning ratio being selected such that said opto-electronic indicator elements, when activated, appear as continuously emitting radiation of an intensity sufficient for visual detection.

15. The circuit arrangement as defined in claim 1, wherein:

said elevator installation contains a predetermined number of elevator cabins serving a predetermined number of storeys;

each said line conductor in said wire matrix being associated with a respective range of storeys in said predetermined number of storeys;

column conductor drivers;

each said column conductor in said wire matrix being associated with a respective storey within said range of storeys; and each said column conductor driver being driven to select one of said storeys within said ranges of storeys.

* * * * *